(12) United States Patent
DuBois et al.

(10) Patent No.: US 11,809,574 B2
(45) Date of Patent: *Nov. 7, 2023

(54) SYSTEM AND METHOD FOR MULTI-SOURCE VULNERABILITY MANAGEMENT

(71) Applicant: F5, Inc., Seattle, WA (US)

(72) Inventors: Lucas DuBois, Canton, MA (US); Joseph Baker, Burlington, MA (US); Charles Hoang, Brighton, MA (US)

(73) Assignee: F5, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,388

(22) Filed: Mar. 16, 2022

(65) Prior Publication Data

US 2022/0207153 A1 Jun. 30, 2022

Related U.S. Application Data

(63) Continuation of application No. 16/516,450, filed on Jul. 19, 2019, now Pat. No. 11,308,219.

(51) Int. Cl.
*G06F 21/57* (2013.01)
*G06F 21/55* (2013.01)
(Continued)

(52) U.S. Cl.
CPC .......... *G06F 21/577* (2013.01); *G06F 21/552* (2013.01); *G06F 21/554* (2013.01);
(Continued)

(58) Field of Classification Search
CPC .... G06F 21/577; G06F 21/552; G06F 21/554; G06F 21/562; G06F 21/566; G06F 21/568; H04L 63/14; H04L 63/1433; H04L 63/20
See application file for complete search history.

(56) References Cited

U.S. PATENT DOCUMENTS

2018/0205755 A1* 7/2018 Kavi ................... H04L 63/1433
2019/0147167 A1 5/2019 Kim et al.
2019/0166149 A1 5/2019 Krylov et al.

OTHER PUBLICATIONS

Pontus, Johnson, et al., "Can the Common Vulnerability Scoring System be Trusted? A Bayesian Analysis," IEEE Transactions on Dependable and Secure Computing, IEEE Service Center, New York, NY, 15(6), Nov. 1, 2018.
(Continued)

*Primary Examiner* — Edward Zee
(74) *Attorney, Agent, or Firm* — Troutman Pepper Hamilton Sanders LLP (F5 PATENTS)

(57) ABSTRACT

A method for multi-source cloud-infrastructure vulnerability management includes receiving cloud-element information related to a cloud-based element in a cloud environment. The method also includes receiving first vulnerability information from a first vulnerability source and receiving second vulnerability information from a second vulnerability source. Cloud-element context information is also received about the cloud-based element from the cloud environment. A multiple-source vulnerability database is then generated from both the first vulnerability information and from the second vulnerability information. The cloud-element information and the cloud-element context information are then evaluated using the multiple-source vulnerability database to generate a vulnerability assessment.

20 Claims, 5 Drawing Sheets

(51) Int. Cl.
G06F 21/56 (2013.01)
G06F 21/00 (2013.01)

(52) U.S. Cl.
CPC .......... *G06F 21/562* (2013.01); *G06F 21/566* (2013.01); *G06F 21/568* (2013.01)

(56) References Cited

OTHER PUBLICATIONS

Supplementary European Search Report for EP20844012, dated Jun. 22, 2023.

* cited by examiner

SYSTEM AND METHOD FOR MULTI-SOURCE VULNERABILITY MANAGEMENT

This application is a continuation of U.S. patent application Ser. No. 16/516,450, filed Jul. 19, 2019, which is hereby incorporated by reference in its entirety.

The section headings used herein are for organizational purposes only and should not to be construed as limiting the subject matter described in the present application in any way.

INTRODUCTION

The movement of data and software applications to the cloud has fundamentally changed the way that computer systems provide software applications and services to users. For example, the network edge of traditional enterprise networks has been replaced by a virtual perimeter, thus changing the way that computers process information and the way that data are accessed by computers. As a result, the ingress and egress point where hardware security appliances and network visibility devices have traditionally been deployed has been eliminated.

Not only is the basic processing architecture different in the cloud, but the scale and growth models of processes, applications, and services are also different in the cloud. For example, cloud-based computer system resources can grow and shrink on very rapid time scales. Also, cloud-based computer systems can be highly distributed so tracking and correctly sequencing events is significantly more challenging. Furthermore, security and vulnerability threat models are also necessarily different in cloud-based computer systems as compared to fixed-infrastructure enterprise networks. Consequently, traditional methods and systems that monitor and protect networked information and systems on the cloud are no longer adequate to protect users.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Systems and methods are needed that manage vulnerabilities in software and/or infrastructure that is cloud based by identifying and/or remediating vulnerable elements as quickly and efficiently as possible. Vulnerability management is a process of identifying, categorizing, classifying, and/or remediating and mitigating vulnerabilities in computer software and/or firmware. In a cloud environment, vulnerabilities exist at multiple layers of a cloud stack. Vulnerabilities of elements in a cloud infrastructure are diverse, numerous and can change rapidly. For example, vulnerabilities are different based on different characteristics of the elements in the cloud infrastructure, such as versions of software executing on the elements, different operating systems used by the elements, different applications executing on the elements, and different infrastructure providers. As such, vulnerability information can be noisy and/or diluted. In a cloud environment, information about a particular known vulnerability is less useful if it is general in nature. Also, in a cloud environment, information is less useful if it is not provided in a context that helps to localize the vulnerability within a cloud infrastructure.

One feature of the methods and apparatus of present teaching is that it produces vulnerability information that is less noisy and/or diluted than prior art vulnerability management. For example, instead of being informed that a bash version is generally vulnerable for all operating systems, a user of a system or method of the present teaching is instead told that their specific version of bash is vulnerable specifically for the software version, such as the Ubuntu version, they are currently using.

Another feature of the methods and apparatus of the present teaching is that it produces vulnerability information that is enriched with cloud-specific context. For example, instead of the user being informed that "a server" is vulnerable, the user is informed, for example that, "your Django application server is vulnerable, and it is on the load balancer." As such, the method and system of the present teaching provides users with a vulnerability assessment that is particularly relevant to the cloud based system at-hand. For example, users are provided a vulnerability on a process installed on a particular Linux version, as opposed to vulnerability information that generically is affecting all Unix systems. The latter generic assessment is difficult for a user to manage and/or remediate as it lacks specificity and context.

The term "cloud-based element" as used herein can refer to hardware, software and combinations of hardware and software deployed in the cloud. For example a cloud-based element can refer to software that is running on cloud-based hardware. A cloud-based element can also refer to a hardware device that is located in the cloud. A cloud-based element can also refer to a virtual machine or other virtual computing operation. A cloud-based element can also refer to both software and the hardware-based computing device on which the software is running. Software, as used herein refers to a collection of executable code that provides processes, applications and/or services. In addition, cloud-based elements as used herein can be various services and/or platforms that run on the cloud.

One aspect of the present teaching is a cloud-native vulnerability management suite of applications that can run on any computing platform, including, for example, virtual machines, servers, desktop, laptop and handheld devices. The computing platforms that execute some or all of the system and method of the present teaching may be dedicated or shared.

Many service providers offer cloud-based elements that include an array of compute, storage, database, networking, and cloud migration services. In addition, a variety of cloud-based elements, such as tools and applications like search, load balancing, and software development tools are available. Amazon Web Services (AWS) offers multiple services including elastic compute cloud (EC2), relational database service (RDS), simple storage service (S3). Amazon also offers services, such as identity and access management (IAM). Likewise, Google offers cloud services, sometimes referred to as Google Cloud. Microsoft offers Azure cloud services. These and other service providers offer a variety of cloud storage services, including managed databases, object, block, and file storage. It is anticipated that there will be rapid growth in commercial cloud service offering in the coming years.

One feature of some embodiments of the multi-source cloud-infrastructure vulnerability management system of the present teaching is that they unify disparate sources of vulnerability information into a common view that is used to generate outputs related to applicable vulnerabilities that are particularly useful to a user. This includes generating alert outputs and providing remediation pathways. That is, various embodiments of multi-source cloud-infrastructure vulnerability management system of the present teaching unify cloud-based vulnerability information collected from different sources associated with different cloud service providers and/or vulnerability information providers so that they can be processed to generate effective and actionable vulnerability assessments.

Some prior art systems rely solely on the National Vulnerability Database (NVD) as the source of vulnerability data. Other prior art systems rely solely on other sources of vulnerability data. In these prior art systems, multiple sources of vulnerability data are not processed together. As such, these prior art systems do not establish a common, richer, view of a particular vulnerability. In contrast, embodiments of the method and system of the present teaching combine NVD information with other sources, including operating-system-specific vulnerability data, such as CentOS Errata and Security Advisories (CESA) and Amazon's Linux Advisories (ALAS). Information from these sources is collected and ingested into a form that supports consistent processing with collected data about a cloud-based element to provide a unified vulnerability picture of that element.

Another feature of the present teaching is that information can be collected from a user's cloud-based elements as well as the various cloud providers that are providing the cloud-based element to the user. The added information from the cloud provider provides context data that produces a better targeted and/or refined vulnerability assessment. By understanding details about, for example, location, type, version, and other contextual information about a particular cloud-based element, vulnerabilities and associated remediation paths for that particular cloud-based element are more specific, more accurate, and better prioritized.

Thus, various embodiments of the method and system of vulnerability management of the present teaching provide users with vulnerability information that is relevant to the system at-hand. For example, a vulnerability can be provided for a process installed on a particular Linux version, in contrast to something that generically is affecting all Unix systems. The method and system of the present teaching provides an advantage over prior art vulnerability management because it reduces false positives, and also because the cloud-provider-specific context makes the information much more clear which cloud-based elements need to be patched.

Figure 1:
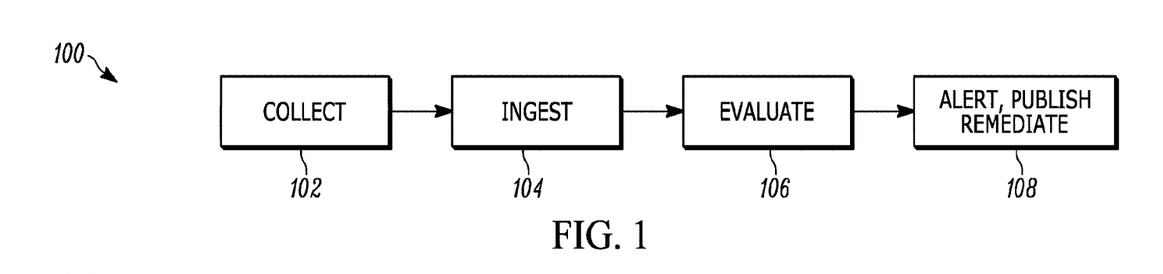
FIG. 1 illustrates steps of an embodiment of a method of multi-source cloud-infrastructure vulnerability management according to the present teaching.

FIG. 1 illustrates the steps of an embodiment of a method 100 of multi-source cloud-infrastructure vulnerability management according to the present teaching. In a first step 102, information is collected. This collection step 102 may involve passive receiving and various other methods of receiving and/or retrieving of information. This collection step 102 can involve retrieving the information from, e.g. a web site, database, or other repository. A large variety of information can be collected in the collection step 102 of various embodiments of the method. For example, in some embodiments, information about the cloud-based infrastructure that is being managed is collected. Information about various cloud-based elements is collected, including cloud-based element details about operating systems, workloads, packages, servers, machine images, hosts, disks and other kinds of storage. In addition, information about other monitored cloud-based elements that relate to a vulnerability assessment may be collected in the collection step 102.

In some embodiments of the collection step 102, information is collected from various sources of vulnerability data. For example, various known sources of public vulnerability data may be collected. Collecting vulnerability information from any particular vulnerability information source can take the form of downloading from a webpage, utilizing an API, reading a file or files, and/or monitoring an RSS feed, as examples. For example, vulnerability information can take the form of CVE lists, vulnerability triage tracking, and/or vulnerability remediation details. As a specific example, information can be collected from the National Vulnerability Database (NVD) run by the National Institute of Standards and Technology (NIST) that provides updated listings of Common Vulnerabilities and Exposures (CVE). In various embodiments, one or more of operating-system-specific vulnerability data, such as CentOS's CESA, Amazon's ALAS Linux security advisories, Ubuntu's vulnerabilities and others may also be collected. Other example sources of vulnerability information may include RedHat, Microsoft, various operating system vendors, as well as various computer and networking system vendors, service providers and open source and proprietary vulnerability databases and websites.

The information can be collected in the collection step 102 in numerous ways. For example, the information can be read from a file. The information can also be received from a network. Also, the information can be downloaded from a webpage. The information can also be requested from a cloud provider by a processor implementing the collection step 102 of the method 100 and/or the information can be sent by the cloud provider to a processor executing the collection step 102 of the method 100. The information can be provided or retrieved at particular times and/or the information can be provided or retrieved on a near-real-time basis. In some embodiments, the collection step 102 receives information from a software agent. Also, in some embodiments, the collection step 102 receives information from an operating system. Also, in some embodiments, the collection step 102 receives information from a database.

In a second step 104, the collected information is ingested to form a common set of information that is based on the information from the multiple sources from which the information was collected. Ingested information is provided in a unified form that can be further processed in later steps. This unified form may take the form of a list or lists that have a specific set of attributes. In some embodiments of the ingestion step 104, a file is received by the collector in the collection step 102 and then in the ingestion step 104, the file is read into the processor and combined with other collected information to produce a file that includes multiple-source information.

In some embodiments, the ingestion step generates two types of ingested information. In these embodiments, the first type of ingested information is cloud element information. The cloud element information is based on the collected information about the cloud-based infrastructure that is being managed. The cloud-based element information may also include context information that is derived from a cloud provider. A second type of ingested information is multi-source vulnerability information. The multi-source vulnerability information is based on the information collected from various sources of vulnerability information.

In a third step 106, the cloud-based element information and the multi-source vulnerability information is evaluated. This evaluation includes, for example, matching particular vulnerabilities to applicable cloud elements in the managed cloud-based infrastructure, prioritizing vulnerabilities, determining vulnerability severity, determining appropriate remediation, and/or determining relevant vulnerabilities. Other vulnerability assessment and/or cloud infrastructure context may also be part of the evaluation step 106.

In a fourth step 108, the evaluated information is processed in downstream processing that performs a number of tasks. For example, the fourth step 108 may generate a vulnerability assessment. The fourth step 108 may determine if a particular vulnerability should be excluded from a particular vulnerability assessment if, for example, the user has chosen to suppress a particular vulnerability of the report. Thus, the fourth step 108 may filter the evaluated information to exclude particular predetermined vulnerabilities. The fourth step 108 may also generate alerts, identify policy violations, publish reports, remediate threats and/or modify non-compliant infrastructure into compliant configurations. The processing in step four 108 of the evaluated information can result in alerts and/or remediation steps that enable users to make decisions or to take actions. The processing in step four 108 of the evaluated information can be used in performing automatic changes to processes and/or configuration or reconfigurations of cloud-based elements to remediate various issues associated with the vulnerabilities identified. The processing in step four 108 can produce outputs related to the generated vulnerability assessment to user IO devices for user consumption. The fourth step 108 may process the evaluated information based on user-supplied rules to produce the various results and actions described herein. In some embodiments, the result of the fourth step 108 generates computer processes that enable alerting, reporting, and analysis for an end user. The results can, for example, produce changes in infrastructure configurations, compliance assurance, establishment of vulnerabilities and threats.

Either or both of the evaluation step three 106 or the processing step four 108 can include a series of processing steps that each produce specific processed data and synthesized information that are derived from the collected information. Some embodiments of step three 106 and/or step four 108 utilize a pipeline processor architecture, which has the advantage that the processing may be applied in any order, because the output of each pipeline stage that feeds the next stage is the common event data. The pipeline processor can, for example, be the pipeline processor disclosed in U.S. patent application Ser. No. 15/846,780, filed on Dec. 17, 2017 and entitled "System and Method For Cloud-Based Operating System Event and Data Access Monitoring", which is assigned to the present assignee. The entire contents of U.S. patent application Ser. No. 15/846,780 are incorporated herein by reference. Each stage can also produce refined evaluated information associated with evaluation step three 106. Various stages of the processing step four 108 can produce, for example, raw event logs, alerts and notifications based on events that satisfy customizable rule sets, vulnerability and exploitation analyses, identification of security threats and vulnerabilities, as well as archives of time-sequenced raw event logs.

Figure 2:
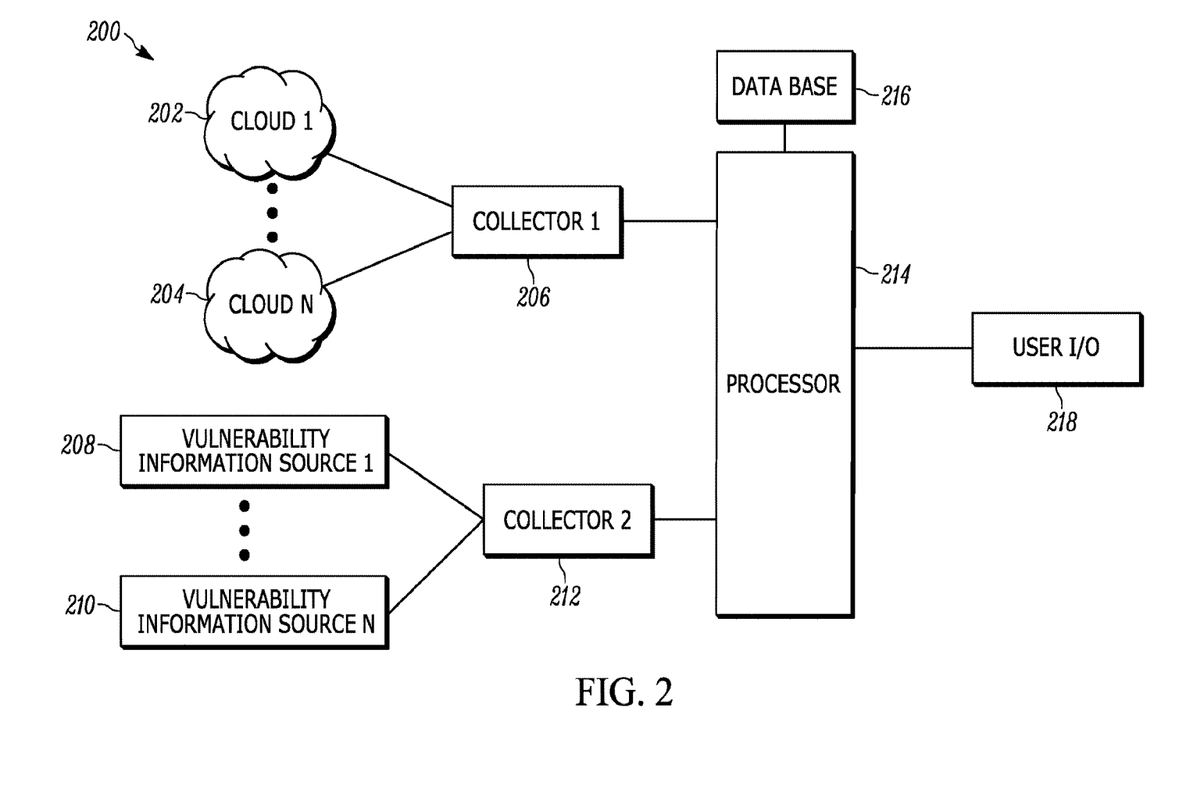
FIG. 2 illustrates a block diagram of an embodiment of a multi-source cloud-infrastructure vulnerability management system according to the present teaching.

FIG. 2 illustrates a block diagram of an embodiment of a multi-source cloud-infrastructure vulnerability management system 200 according to the present teaching. One or more cloud environments, cloud 1 202 to cloud N 204, are connected to a collector 206. The term "cloud environment" as used herein is a set of cloud-based elements that can be provided to a user. In some embodiments, a cloud environment is provided by a service provider such as Amazon, Google, Microsoft, and numerous other cloud service providers. In some embodiments, the cloud environment is an on-premise, or internal cloud environment, which is hosted, for example, within one or more organization's offices, data centers, networks and/or other processing and/or input/output system facilities. The term "cloud system" as used herein is a set of cloud elements that reside in one or more cloud environments that are used by a large array of users including, for example, companies that provide a variety of web services and software as a service platforms. The collection systems 208, 210 receive cloud element information from the cloud environments 202, 204. Multiple vulnerability information sources 208, 210 are connected to the collector 212. The collectors 206, 212 gather information from the cloud environments 202, 204 and the vulnerability information sources 208, 210 using various methods. The multiple collectors 206, 212 do not necessarily use the same method. In various embodiments, the number of cloud environments, number of vulnerability information sources and number of collectors varies.

The collectors 206, 212 are connected to a processor 214. The processor can take the form of a variety of processor systems. For example, the processor 214 can be a single processor or can be multiple processors. The processor 214 can be hardware based or the processor 214 can be a virtual machine processor. The processor 214 can also be a cloud-based processor. In addition, the processor 214 can be a service that executes on a cloud infrastructure. The processor 214 is connected to a database 216. The database 216 can be a single database or the database can include multiple databases. Further, the database(s) 216 can be private or public databases.

The processor 214 is connected to one or more user input/output devices 218. The user input/output device(s) 218 can include, for example, a web site, a computer, an application, a management system, or any of a variety of devices for managing, monitoring, modifying, and/or operating a cloud infrastructure. For simplicity, FIG. 2 is shown to illustrate only a subset of possible elements of the monitoring system of the present teaching. Some embodiments of the multi-source cloud-infrastructure vulnerability management system 200 comprise a large-scale system with numerous other cloud environments, collectors, databases, processors and user I/O.

Referring to both FIGS. 1 and 2, the processor 214 executes some or all of the steps of the method 100. The cloud environments 202, 204 generate cloud element information that is received and/or retrieved in step one 102 by the collector 206. The vulnerability information sources 208, 210 generate vulnerability information that is received and/or retrieved in step one 102 by the collector 212. The processor 214 executes all or part of the ingestion step two 104 and/or the evaluation step three 106. The processor 214 can also execute step four 108 downstream to generate alerts and other outputs. The processor 214 also provides information to the database 216. In addition, the processor 214 can use information retrieved from the database 216 and/or information retrieved from any of the results of the ingestion step two 104, the evaluation step three 106, and the downstream processing step 108. The processor 214 then sends the results of the downstream processing of common event data to the user I/O 218. In some embodiments, the user I/O performs some or all of the processing step four 108.

In some embodiments, one or more of the collectors 206, 212 is a collection processor that is part of processor 214. In some embodiments, the processor 214 includes an ingestion processor that performs the ingestion step two 104, an evaluation processor that performs the evaluation step three 106, and a downstream processor that executes at least some of the processing in step four 108. These various processors can be the same or different physical and or virtual processors.

Figure 3:
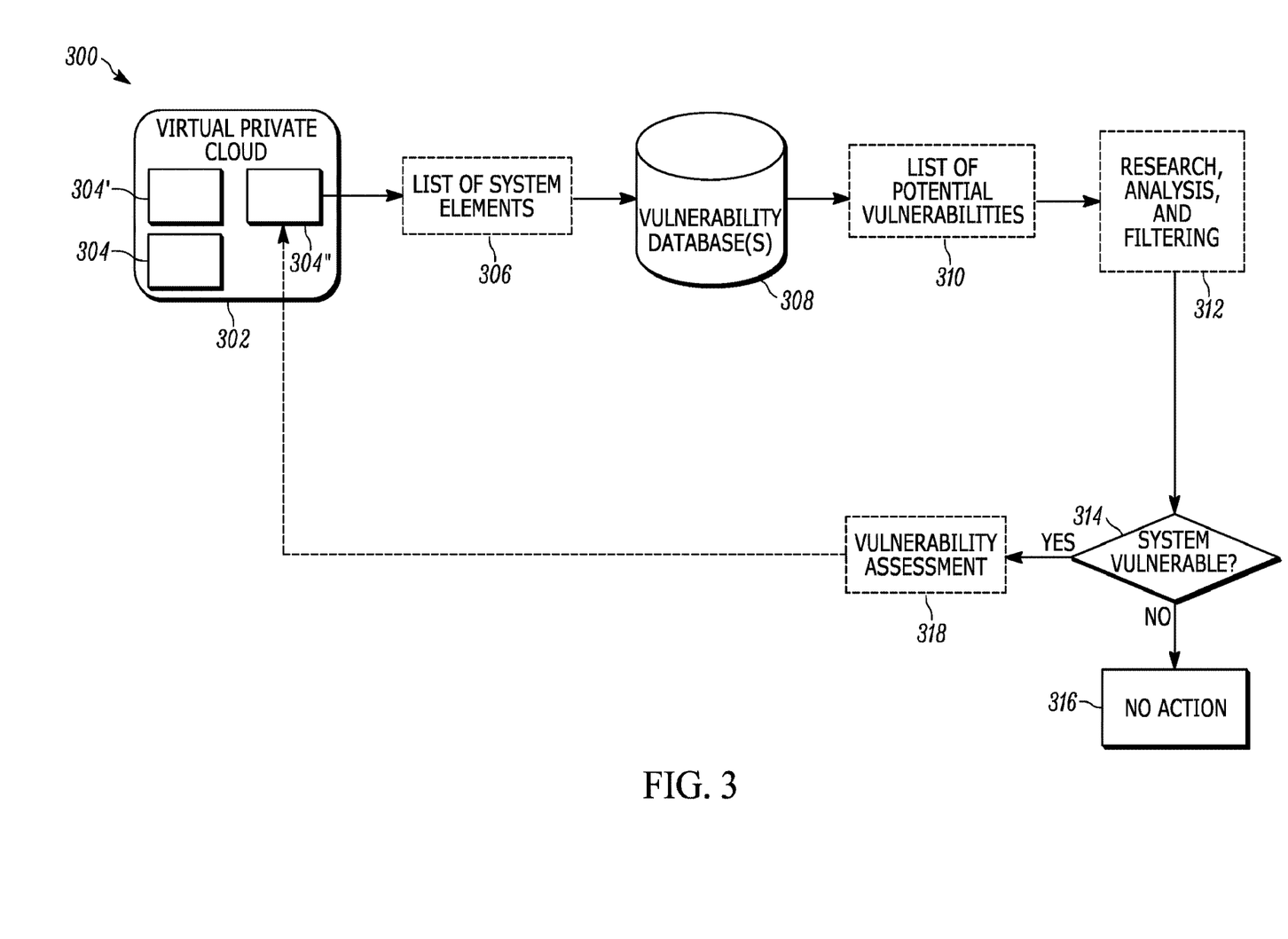
FIG. 3 illustrates an embodiment of a workflow of a multi-source cloud-infrastructure vulnerability management system managing a virtual private cloud according to the present teaching.

FIG. 3 illustrates an embodiment of a workflow for a multi-source cloud-infrastructure vulnerability management system 300 managing a virtual private cloud 302 according to the present teaching. A virtual private cloud 302 includes one or more software agents 304, 304', and 304". A virtual private cloud is a cloud-based service that is typically provided by a cloud service provider. A virtual private cloud is also a suite of shared computing resources that comprise any of a variety of cloud-based elements, which is allocated to a user within a public cloud environment. Virtual private clouds provide a level of isolation between the different users that are sharing the computing resources in the cloud environment.

One or more of the software agents 304, 304', and 304" collects information about various cloud-based elements in the virtual private cloud 302. The software agents 304, 304', 304" can collect this information from a management platform in the virtual private cloud 302. For example, the software agents 304, 304', and 304" can collect information from a package manager. The software agents 304, 304', and 304" can also collect information directly from the cloud based-element, or a related cloud-based element in the virtual private cloud 302. A list of system elements 306 is generated. For example, a list of all the packages running on the virtual private cloud 302, their operating system (OS) type and their operating system version can be generated as part of the list of system elements 306.

Multiple vulnerability databases 308 are checked to identify any possible vulnerability that is applicable to the elements in the list of system elements. For example, vulnerabilities for a particular package and OS type and OS version may be identified.

A list of potential vulnerabilities 310 is generated for all the cloud-based elements that apply. Potential vulnerability information 310 can include, for example a criticality of a particular vulnerability, a vector of entry for a vulnerability, and other details. Additional processing 312 that researches, analyzes, and filters the list of potential vulnerabilities 312 is performed. In some embodiments, this processing 312 produces only vulnerabilities that are specific to the cloud-based elements being managed. In some embodiments, the processing 312 applies computer security industry best practices and other security experience to establish a severity of the vulnerabilities. Based on the determined severity from the processing 312, a decision step 314 is processed to determine if the system is vulnerable. If not, no action is taken 316. If so, a vulnerability assessment 318 is processed.

The result of the vulnerability assessment 318 provides a variety of information about the vulnerability of the cloud-based elements in the virtual private cloud 302. For example, in some embodiments, a list of vulnerable packages and the associated CVEs are provided. In some embodiments, servers that are affected by vulnerabilities are provided. In some embodiments, aggregated vulnerability key performance indicators (KPI) are provided. As a result of the vulnerability assessment, the user of the virtual private cloud 302 can take remediation actions, e.g. patching software, modifying configurations, etc.

In various embodiments, the process cycle of the multi-source cloud-infrastructure vulnerability management system 300 is repeated as the software agents 304, 304', 304" collect information about various cloud-based elements in the virtual private cloud 302 on an established time cycle. In some embodiments, the multi-source cloud-infrastructure vulnerability management system 300 workflow is initiated by a user. In some embodiments, all or some of the workflow is repeated following remediation actions taken, and the resulting vulnerability assessment will be reflected as no longer a vulnerability for those items on the list 318 for which remediation was successful.

Some embodiments of the present teaching install one or more of the software agents 304, 304', and 304" at the host level of the virtual private cloud 302 so servers can be scanned at the deepest level for vulnerable installed packages. The software agents 304, 304', and 304" examine the package information on the workload. The system and method of the present teaching use processing 312 to inform a user whether there are vulnerable packages inside this examined package information. The processing 312 can organize workflows around what is important based on common vulnerabilities and exposure (CVEs). This supports displaying prioritized detected vulnerabilities directly on a user dashboard (not shown).

Figure 4:
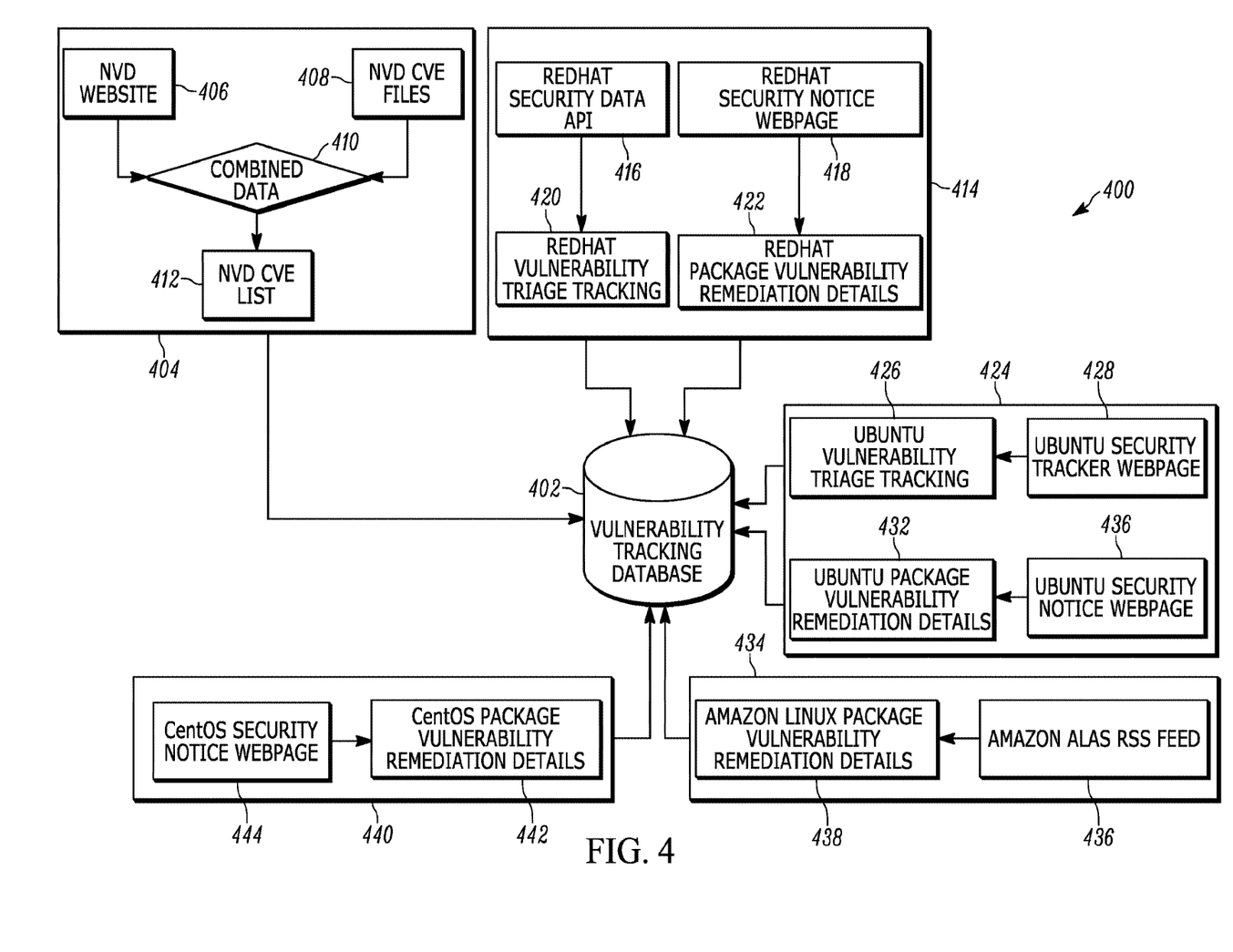
FIG. 4 illustrates a block diagram of an embodiment of a method and system of collecting multi-source vulnerability information of the present teaching.

FIG. 4 illustrates an embodiment of a method and system of collecting multi-source vulnerability information 400 of the present teaching. The vulnerability data is input into a vulnerability tracking database 402. As described herein, one public source of vulnerability information is the National Vulnerability Database (NVD) source 404. The NVD source 404 maintains a NVD web site 406 and NVD common vulnerability and exposures (CVE) files 408 that both contribute to combined data 410 on known vulnerabilities. The combined data 410 is used to produce a NVD CVE list 412. In some embodiments, information from the NVD CVE list 412 is collected and stored in the vulnerability tracking database 402.

The data that is stored in the vulnerability tracking database 402 can include, for example, a vulnerability package list that is represented in a common platform enumeration (CPE) format. That is, information on vulnerabilities associated with predetermined platforms within a cloud-based system, software and/or packages. Vulnerabilities include, for example, security-related software flaws and misconfigurations. Software vulnerabilities can, for example, be associated with code, package designs and/or system architecture. Collected data can also include, for example, vulnerability impact details, such as attack vector and score. The score may be based, for example, on the Common Vulnerability Scoring System (CVSS) provided as part of the NIST NVD.

A second vulnerability information source is RedHat 414. The RedHat source 414 includes a RedHat security data API (application interface) 416 that provides RedHat vulnerability triage tracking 420. The source 414 also includes a RedHat security notice webpage 418 that provides RedHat package vulnerability remediation details 422. The RedHat vulnerability triage tracking 420 information are collected and stored in the vulnerability tracking database 402. The RedHat package vulnerability remediation details 422 information is collected and stored in vulnerability tracking database 402.

A third vulnerability information source is Ubuntu 424. The Ubuntu source 424 includes a Ubuntu security tracker webpage 428 that provides Ubuntu vulnerability triage tracking 426. The source 424 also includes an Ubuntu security notice webpage 436 that provides Ubuntu package vulnerability remediation details 432. The Ubuntu vulnerability triage tracking 426 information is collected and stored in the vulnerability tracking database 402. The Ubuntu package vulnerability remediation details 432 information is collected and stored vulnerability tracking database 402.

A fourth vulnerability information source is Amazon 434. The Amazon source 434 includes an Amazon ALAS RSS feed 436 that provides Amazon Linux package vulnerability remediation details 438. ALAS is the Linux security advisory service. RSS is the well-known really simple syndication standard for content distribution. The Amazon Linux package vulnerability remediation detail 438 information is collected and stored in the vulnerability tracking database 402.

A fifth vulnerability information source is CentOS 440. The CentOS source 440 includes an CentOS security notice webpage 444 that provides CentOS package vulnerability remediation details 442. CentOS package vulnerability remediation detail 442 information is collected and stored in the vulnerability tracking database 402.

In various embodiments, the collecting and storing of information from the sources 404, 414, 424, 434, 440 is as described in connection with the collection 102 and ingestion 104 steps described in connection with the method of multi-source cloud-infrastructure vulnerability management of FIG. 1. For example, the vulnerability tracking database 402 can be the database 216 described in connection with FIG. 2.

Figure 5:
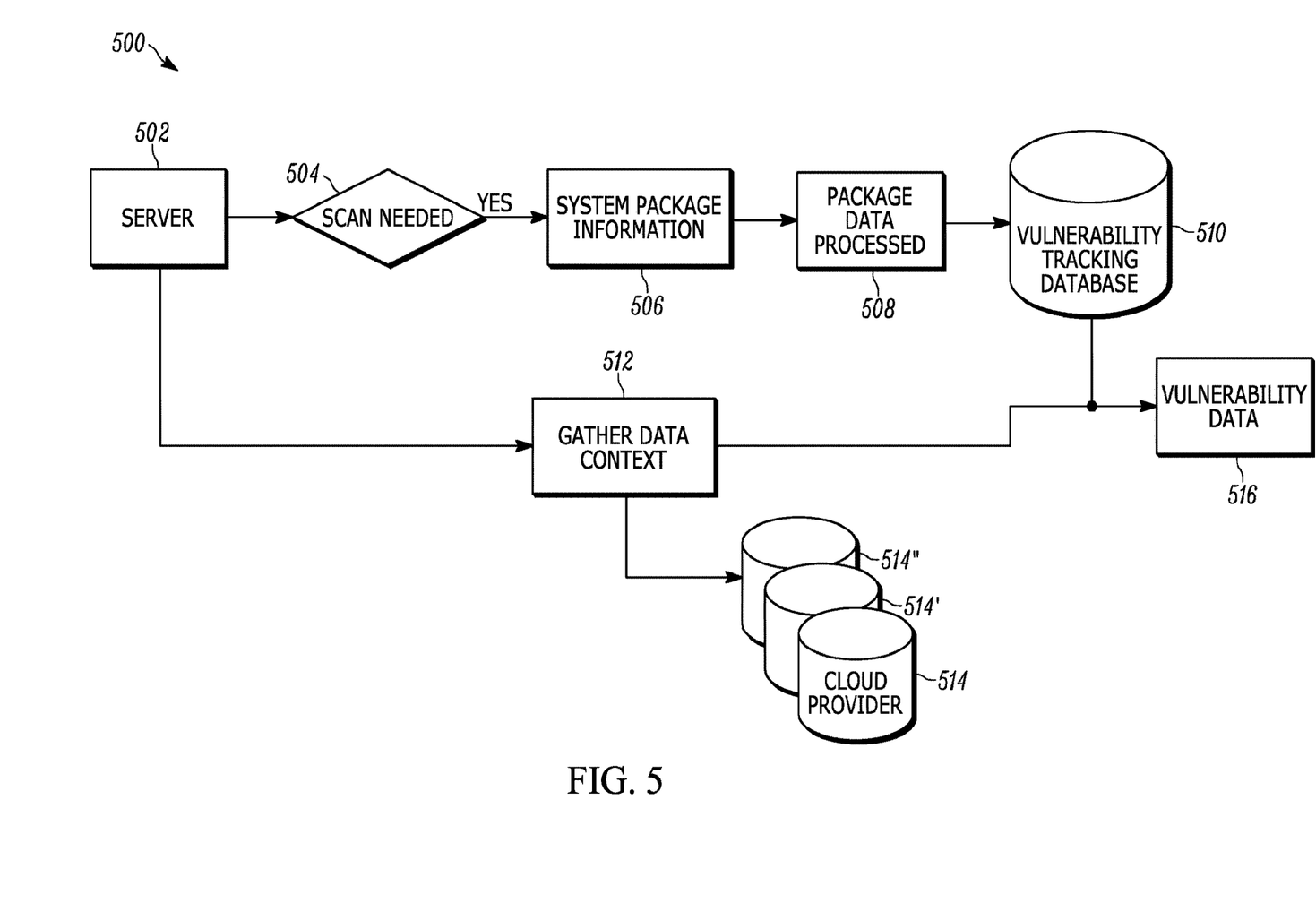
FIG. 5 illustrates an embodiment of a workflow of a method and system of managing multi-source vulnerability information for a server of the present teaching.

FIG. 5 illustrates an embodiment of a workflow of a method and system of managing multi-source vulnerability information 500 for a server 502 of the present teaching. At the start of the workflow 500, the server is in an unknown state of vulnerability. The system determines at a decision point 504 if a scan is needed. This determination is triggered (scan needed=yes), for example, on a newly-registered server. In some embodiments, the determination is triggered at user-configurable points in time. In some embodiments, the determination is triggered at automatic trigger points that are determined by the system, such as when a new vulnerability is issued by a vulnerability information source or otherwise determined by some other threshold. If it is determined at the decision point 504 that a scan is needed, the collector acquires package information 506 about the server 502. In some embodiments, a software agent acquires the package information 506 about the server 502.

The acquired package information is processed 508 in an ingestion step. This processing step 508 contextualizes the acquired package information and puts the data into a format that can be compared against vulnerabilities in a vulnerability tracking database 510. In various embodiments, this vulnerability tracking database 510 is the vulnerability tracking database 402 described in connection with FIG. 4. The processing 508 allows specific information to be pulled from the vulnerability tracking database 510. For example, a specific version of bash on the server 502 has a particular Ubuntu vulnerability. Thus, vulnerabilities that are specific to a server type, a package type, package version and/or or other details about the package are pulled from the vulnerability tracking database 510.

In addition, context data is collected 512 from one or more cloud providers 514, 514', and 514" about the server 502. Information is also gathered from the server 502 to determine specific data and data context about the server 502. As an example, context data can be gathered that informs that the user has identified a particular server 502 as a front-line webserver on Azure cloud platform. This context data about the server 502 is ingested and, together with the information gathered from the vulnerability tracking database 510, is processed 516 to generate vulnerability data for a user of the server 502. Continuing with this example, the output of the processing, which is in the form of vulnerability data 516, can be, for example, that a user's font-line webservers have a bash vulnerability. As such, a combination of the specificity of the package and server information gathered during collection and ingestion, which is in a format that can be matched to a vulnerability tracking database 510, and which can contain vulnerabilities from multiple sources, and the context provided by the context collected 512 from the cloud provider(s) 514, 514', and 514" allows the processor to produce vulnerability data 516 that is a very specific and actionable vulnerability assessment that cannot be provided by prior art vulnerability assessments.

Figure 6:
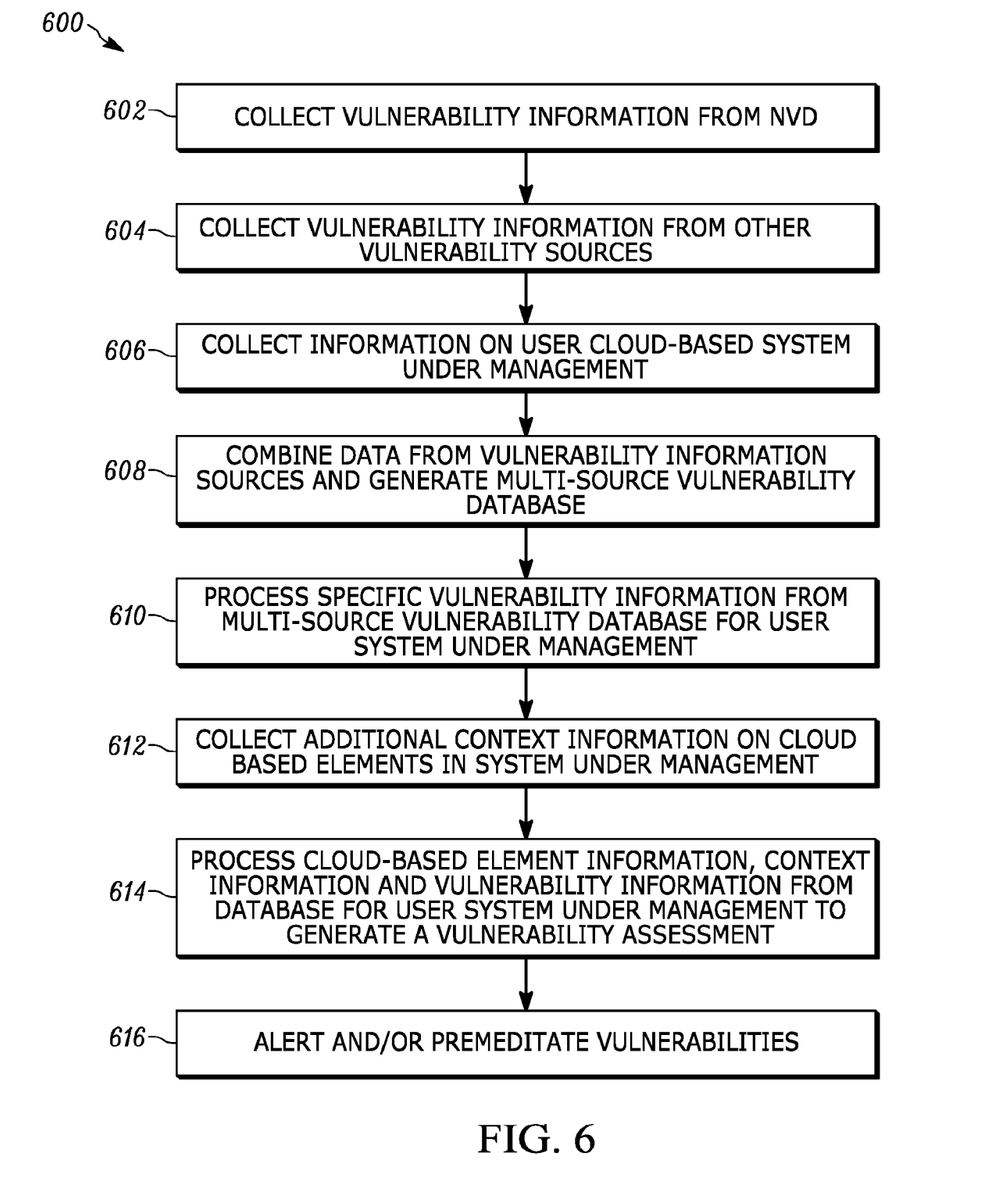
FIG. 6 illustrates detailed steps in an embodiment of a method of vulnerability management of the present teaching.

FIG. 6 illustrates detailed steps in an embodiment of a method 600 of vulnerability management of the present teaching. In step one 602 of the method 600, vulnerability information is collected from NVD. In step two 604 of the method 600, vulnerability information is collected from other sources. For example, the vulnerability information can be collected in step two 604 from specific operating systems and their provided vulnerability data. For example, CentOS, Ubuntu, Linux. Some of the information can be in the form of data stored via web pages and can be obtained through automatically recognizing vulnerability data on those webpages. Some of the information can also be provided in the form of data obtained through API calls with an OS-specific data source. Collecting information through various means and from various sources is an important distinction that provides a significant advantage for vulnerability management using the system and method of the present teaching. Some embodiments use collectors that are responsible for gathering the specific vulnerability data necessary (e.g., a collector for NVD data, a collector for CESA data, a collector for Ubuntu vulnerabilities, etc.). These collectors implement a specific collection method to collect specific vulnerability information in various embodiments.

Step three 606 of the method 600 is collection of information about a user's cloud-based system under management. Step three 606 involves collecting cloud-element information related to a cloud-based element in a cloud environment. In some embodiments, step three 606 is accomplished through package scanning performed by a software agent. In some embodiments step three 606 collects information about an operating system as well as installed packages. This information may include, for example type and version.

Step four 608 of the method 600 processes the collected data from different vulnerability sources to put it in a proper form for storage and processing as part of a multi-source vulnerability database. Some embodiments of step four 608 store data from each data source separately, without any context from other data sources. Other embodiments of step four 608 combine all of the vulnerability information from different vulnerability sources collected in step one 602 and step two 604, and only store specific vulnerability information that applies to a user's specific systems. For example, embodiments of step four 608 may only produce vulnerability information on specific types of Unix operating systems as opposed to Unix in general. Some embodiments of step four 608 process vulnerability from multiple vulnerability sources to generate and store in the multi-source vulnerability database common vulnerabilities that are less noisy and/or have better specificity than as reported in the individual separate sources. For example, a common vulnerability in the multi-user vulnerability database may replace two separately reported vulnerabilities from two different sources that relate to the same vulnerability.

Step five 610 of the method 600 processes specific vulnerability information from the vulnerability database for the user system under management as determined in step three 606.

Step six 612 of the method 600 collects additional context information on cloud based elements in the system under management. This information can be collected from the cloud providers that provide the cloud-based elements in the user's system. Context information can be important in determination of severity of a particular vulnerability. For example, a vulnerable package accessible only by a development team can present a lower risk than a vulnerability that is accessible via a webpage to the entire internet.

Step seven 614 of the method 600 processes cloud-based element information, context information and vulnerability information from the multi-source vulnerability database for user system under management to generate a vulnerability assessment. Using gathered context (e.g. server tags) helps prioritize vulnerability remediation and provides extra detail and context to the user about the system vulnerabilities provided in the vulnerability assessment. Based on the context, the importance of the vulnerability is more relevant. For example, context helps a user understand which servers must be patched first in order to reduce the infrastructure's overall risk significantly. Examples of contexts include attributes such as: whether or not the server is serving user web traffic; whether or not a vulnerability leveraging a particular port is exposed on the cloud provider firewall rules; and if there is vulnerability in a database package.

Step eight 616 of the method 600 provides alerts and/or remediation details that enable users to make decisions or to take actions relating to the vulnerabilities identified in step seven 614. Step eight 616 can provide a reconfiguration of cloud-based elements based on the vulnerabilities identified in step seven 614. For example, a software patch can be applied, a port can be changed, and/or a database can be modified. Also, all unnecessary packages can be removed, OS notices can be reviewed and identified for a CVE and suggested best practice can be applied, and packages can be confirmed for being the latest version. A vulnerability score can be applied. The vulnerability score can be based on the Common Vulnerability Scoring System v2 (CVSS v2) used by the NVD. In these cases, the severity can be high (H), medium (M), or low (L) as determined by NVD. Some embodiments of the method 600 allow users to suppress particular vulnerabilities, and these are not processed and/or reported by the system. Some embodiments of step eight 616 accommodate the case in which a user establishes an acceptance of the risk of a particular vulnerability. For example, a user may determine that a presented risk for a particular package vulnerability is acceptable. These risk acceptance criteria may be predetermined and/or they may be determined by the user at various points of the execution of the steps of the method 600. In some embodiments user risk accepted vulnerabilities are suppressed and/or filtered out in step eight 616.

One feature of some embodiments of the present teaching is that they compare a large array of published CVE for all installed packages. Cross-checks can be applied against all corresponding vendor advisories on those packages, and vulnerabilities can be pinpointed, for example, to a particular image ID on affected servers. This approach substantially reduces false positive rates. Some embodiments of the system and method of the present teaching support automatically examining package information on a workload and checking against the NVD. Some embodiments of the present teaching also can provide manual, curated updates, cross references with operating systems vendors, and proactive direction to users regarding which AMI needs to be updated. Systems according to the present teaching are supported across all environments, cloud security providers, and containers, thereby reducing complexity.

One feature of some embodiments of the present teaching is that they can support vulnerability management at the workload layer, which is highly efficient. In general, vulnerability management relates to monitoring the configuration on a user's workloads and infrastructure to detect any increase in an attack surface. However, it is possible in practice that unauthorized packages are installed in the base image, or that packages are manually installed on production environments. This makes tracking patches in cloud environments complex and tedious. For example, new base images (e.g., Amazon Machine Images, or AMIs on an Amazon cloud-based system) are typically made every couple of weeks, leaving servers vulnerable in between the time a vulnerability comes out and when the patch gets added to the AMI. Widespread vulnerabilities, such as Heartbleed or Shellshock, pose serious problems when the attack surface is vulnerable for too long. For example, cloud based infrastructure may include servers which are outside the immutable infrastructure paradigm. These servers are often the most important servers in an environment (e.g. OpenVPN servers, jumphosts, etc.), thus requiring constant monitoring for packages with vulnerabilities.

Furthermore, many packages are pinned for application dependency reasons and are not updated by infrastructure code. This leaves these packages vulnerable as well, unless regularly monitored and patched. Automated vulnerability scans examine package information in near-real time to determine if and where there are vulnerable packages. When implemented at the host level, automated scans mean vulnerabilities can be identified and fixed at every step of the application lifecycle.

Another feature of the system and method for multi-source vulnerability management of the present teaching is that it provides a cloud-native (i.e. designed specifically for the cloud), platform-independent, comprehensive set of vulnerability management applications. The results of embodiments of the vulnerability management method and system can provide synthesized and contextualized data to users relating to vulnerabilities ongoing in their cloud-based infrastructure. In one example, the results and outputs from the system and method aid remediation of vulnerabilities across a broad spectrum of vulnerability types because it can apply a comprehensive set of known vulnerabilities.

Yet another feature of the method and system of the present teaching is that it utilizes processing assets distributed in a cloud-based computing architecture in a cost-effective manor. As a result, the systems according to the present teaching scale in a cost-effective, modular fashion as the managed information systems grow. This is, at least in part, because the system relies on cloud-based processing resources that can be expanded as the information system demand expands, and reduced when the information system demand wanes. Systems according to the present teaching also easily accommodate the addition of new computer infrastructure management, compliance, threats, vulnerabilities, and new monitoring applications by supporting a configurable and software-application-based monitoring approach. This is in contrasted to known systems where individual point solutions for vulnerability management that require specialized, costly, hardware and provide a smaller suite of cloud-based system management applications.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

We claim:

1. A non-transitory computer readable medium having stored thereon instructions comprising executable code which when executed by one or more processors, causes the processors to:

receive cloud-element data related to a cloud-based element in a cloud environment;

receive first vulnerability data from a first vulnerability source;

receive second vulnerability data from a second vulnerability source that is a vendor of a particular operating system;

receive cloud-element context data comprising the particular operating system of the cloud-based element from the cloud environment;

replace the first vulnerability source and the second vulnerability source with a multiple-source vulnerability database generated from both the first vulnerability data and from the second vulnerability data such that a reported vulnerability from the first vulnerability source and a separate reported vulnerability from the second vulnerability source are combined into a single common vulnerability in the multiple-source vulnerability database;

evaluate the cloud-element data and the cloud-element context data using the multiple-source vulnerability database to generate a vulnerability assessment related to the single common vulnerability and the particular operating system; and generate a list of remediation steps in response to the vulnerability assessment.

2. The non-transitory computer readable medium of claim 1 wherein the vulnerability assessment comprises a prioritized list of vulnerabilities, a list of vulnerabilities with associated severities, or aggregated vulnerability key performance indicators.

3. The non-transitory computer readable medium of claim 1 wherein the instructions further comprise executable code which when executed by one or more processors, causes the processors to:

prioritize the list of remediation steps.

4. The non-transitory computer readable medium of claim 3 wherein the prioritized list of remediation steps comprises a recommended software patch or a software removal package.

5. The non-transitory computer readable medium of claim 1 wherein the generate the multiple-source vulnerability database from both the first vulnerability data and from the second vulnerability data, further comprises executable code which when executed by one or more processors, causes the processors to:

process the first and second vulnerability data to generate a common vulnerability.

6. The non-transitory computer readable medium of claim 1 wherein the evaluate the cloud-element data and the cloud-element context data using the multiple-source vulnerability database to generate the vulnerability assessment, further comprises executable code which when executed by one or more processors, causes the processors to:

list vulnerabilities that are specific to the cloud-based element.

7. The non-transitory computer readable medium of claim 1 wherein the receive the first and/or second vulnerability data from at least one of the first and second vulnerability sources, further comprises executable code which when executed by one or more processors, causes the processors to:

receive vulnerability data from a public vulnerability database;

receive vulnerability data from a webpage;

receive vulnerability data from a file; or receive vulnerability data from an operating-system-specific data source.

8. The non-transitory computer readable medium of claim 1 wherein the cloud-element data comprises package data, a package type, or server data.

9. The non-transitory computer readable medium of claim 8 wherein the server data comprises server type or server web traffic.

10. The non-transitory computer readable medium of claim 1 wherein the instructions further comprise executable code which when executed by one or more processors, causes the processors to:
provide the vulnerability assessment to a client.

11. A system, comprising one or more client devices or server devices, the system comprising memory comprising programmed instructions stored thereon and one or more processors configured to execute the stored programmed instructions to:
receive cloud-element data related to a cloud-based element in a cloud environment;
receive first vulnerability data from a first vulnerability source;
receive second vulnerability data from a second vulnerability source that is a vendor of a particular operating system;
receive cloud-element context data comprising the particular operating system of the cloud-based element from the cloud environment;
replace the first vulnerability source and the second vulnerability source with a multiple-source vulnerability database generated from both the first vulnerability data and from the second vulnerability data such that a reported vulnerability from the first vulnerability source and a separate reported vulnerability from the second vulnerability source are combined into a single common vulnerability in the multiple-source vulnerability database;
evaluate the cloud-element data and the cloud-element context data using the multiple-source vulnerability database to generate a vulnerability assessment related to the single common vulnerability and the particular operating system; and
generate a list of remediation steps in response to the vulnerability assessment.

12. The system of claim 11 wherein the vulnerability assessment comprises a prioritized list of vulnerabilities, a list of vulnerabilities with associated severities, or aggregated vulnerability key performance indicators.

13. The system of claim 11 wherein the programmed instructions, when executed by the one or more processors, cause the one or more processors to:
prioritize the list of remediation steps.

14. The system of claim 13 wherein the prioritized list of remediation steps comprises a recommended software patch or a software removal package.

15. The system of claim 11 wherein the generate the multiple-source vulnerability database from both the first vulnerability data and from the second vulnerability data, further comprises one or more additional instructions, when executed by the one or more processors, cause the one or more processors to:
process the first and second vulnerability data to generate a common vulnerability.

16. The system of claim 11 wherein the evaluate the cloud-element data and the cloud-element context data using the multiple-source vulnerability database to generate the vulnerability assessment, further comprises one or more additional instructions, when executed by the one or more processors, cause the one or more processors to:
list vulnerabilities that are specific to the cloud-based element.

17. The system of claim 11 wherein the receive the first and/or second vulnerability data from at least one of the first and second vulnerability sources, further comprises one or more additional instructions, when executed by the one or more processors, cause the one or more processors to:
receive vulnerability data from a public vulnerability database;
receive vulnerability data from a webpage;
receive vulnerability data from a file; or
receive vulnerability data from an operating-system-specific data source.

18. The system of claim 11 wherein the cloud-element data comprises package data, a package type, or server data.

19. The system of claim 18 wherein the server data comprises server type or server web traffic.

20. The system of claim 11 wherein the programmed instructions, when executed by the one or more processors, cause the one or more processors to:
provide the vulnerability assessment to a client.

* * * * *